(12) United States Patent
Bays et al.

(10) Patent No.: US 11,388,093 B2
(45) Date of Patent: *Jul. 12, 2022

(54) DISTRIBUTED CUSTOMER PREMISES EQUIPMENT

(71) Applicant: CIENA CORPORATION, Hanover, MD (US)

(72) Inventors: Robert Bays, San Francisco, CA (US); Srinivas Narayan, London (GB)

(73) Assignee: CIENA CORPORATION, Hanover, MD (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/843,182

(22) Filed: Apr. 8, 2020

(65) Prior Publication Data

US 2020/0236045 A1 Jul. 23, 2020

Related U.S. Application Data

(60) Continuation of application No. 16/292,644, filed on Mar. 5, 2019, now Pat. No. 10,652,148, which is a
(Continued)

(51) Int. Cl.
*H04L 45/74* (2022.01)
*H04L 49/00* (2022.01)
(Continued)

(52) U.S. Cl.
CPC ............ *H04L 45/74* (2013.01); *H04L 45/586* (2013.01); *H04L 49/70* (2013.01); *H04L 67/1097* (2013.01)

(58) Field of Classification Search
None
See application file for complete search history.

(56) References Cited

U.S. PATENT DOCUMENTS 6,085,215 A 7/2000 Ramakrishnan et al.
6,675,218 B1 1/2004 Mahler et al.
(Continued)

FOREIGN PATENT DOCUMENTS

CN 107005471 8/2017
CN 107078956 8/2017
(Continued)

OTHER PUBLICATIONS

Anonymous, "Agile Networking and High Performance", Network Function Virtualization, Brocade Byatta 5600 VRouter, Sep. 2014, 8 pages.
(Continued)

*Primary Examiner* — Brian S Roberts
(74) *Attorney, Agent, or Firm* — Guntin & Gust, PLC; Jay Anderson

(57) ABSTRACT

Techniques are disclosed for providing a distributed customer premises equipment (CPE) comprising several devices. A computer system executes a control plane subsystem that sends network control packets using one or more network interfaces for controlling network data packet forwarding operations performed by devices. The network control packets includes a first set of network control packets sent to a first device located at a second location and a second set of network control packets sent to a second device located at a third location.

20 Claims, 6 Drawing Sheets

Related U.S. Application Data division of application No. 15/338,082, filed on Oct. 28, 2016, now Pat. No. 10,257,089, and a continuation-in-part of application No. 14/925,809, filed on Oct. 28, 2015, now Pat. No. 10,348,621, said application No. 15/338,082 is a continuation-in-part of application No. 14/966,557, filed on Dec. 11, 2015, now Pat. No. 9,948,554.

(60) Provisional application No. 62/385,352, filed on Sep. 9, 2016, provisional application No. 62/072,971, filed on Oct. 30, 2014, provisional application No. 62/075,175, filed on Nov. 4, 2014, provisional application No. 62/241,059, filed on Oct. 13, 2015, provisional application No. 62/090,627, filed on Dec. 11, 2014.

(51) Int. Cl.
*H04L 45/586* (2022.01)
*H04L 67/1097* (2022.01)

(56) References Cited

U.S. PATENT DOCUMENTS

| | | | |
|---|---|---|---|
| 7,571,156 | B1 | 8/2009 | Gupta et al. |
| 8,717,895 | B2 | 5/2014 | Koponen et al. |
| 8,799,422 | B1 | 8/2014 | Qu et al. |
| 8,954,968 | B1 | 2/2015 | Pohl et al. |
| 8,958,420 | B1* | 2/2015 | Shekhar ............... H04L 49/25 370/384 |
| 9,143,557 | B2 | 9/2015 | Guichard et al. |
| 9,948,554 | B2 | 4/2018 | Bays |
| 10,257,089 | B2* | 4/2019 | Bays .................. H04L 49/70 |
| 10,348,621 | B2 | 7/2019 | Bays |
| 2006/0072480 | A1 | 4/2006 | Deval et al. |
| 2006/0106934 | A1 | 5/2006 | Figaro et al. |
| 2006/0206300 | A1 | 9/2006 | Garg et al. |
| 2008/0043756 | A1 | 2/2008 | Droux et al. |
| 2008/0155549 | A1 | 6/2008 | Blinick et al. |
| 2009/0300605 | A1 | 12/2009 | Edwards et al. |
| 2010/0050172 | A1 | 2/2010 | Ferris |
| 2011/0200184 | A1 | 8/2011 | Zelenski et al. |
| 2012/0120965 | A1 | 5/2012 | Khawer et al. |
| 2012/0198441 | A1 | 8/2012 | Mahdavi et al. |
| 2012/0281520 | A1 | 11/2012 | Ahmed et al. |
| 2012/0324442 | A1 | 12/2012 | Barde |
| 2013/0058346 | A1 | 3/2013 | Sridharan et al. |
| 2013/0067466 | A1 | 3/2013 | Combs et al. |
| 2013/0223226 | A1 | 8/2013 | Narayanan et al. |
| 2013/0227672 | A1 | 8/2013 | Ogg et al. |
| 2014/0029451 | A1 | 1/2014 | Nguyen |
| 2014/0122678 | A1 | 5/2014 | Miner et al. |
| 2014/0137182 | A1 | 5/2014 | Elzur |
| 2014/0201374 | A1* | 7/2014 | Ashwood-Smith ....... G06F 9/50 709/226 |
| 2014/0259012 | A1 | 9/2014 | Nandlall et al. |
| 2014/0301192 | A1* | 10/2014 | Lee ..................... H04L 47/10 370/230 |
| 2014/0328159 | A1 | 11/2014 | Rebella et al. |
| 2015/0131989 | A1 | 5/2015 | Syed et al. |
| 2015/0169340 | A1 | 6/2015 | Haddad et al. |
| 2015/0326535 | A1 | 11/2015 | Rao et al. |
| 2015/0372973 | A1* | 12/2015 | Lopez Da Silva . H04L 12/2856 370/254 |
| 2016/0020962 | A1* | 1/2016 | Carey ................. H04L 41/5054 709/223 |
| 2016/0094364 | A1 | 3/2016 | Subramaniyam et al. |
| 2016/0127226 | A1 | 5/2016 | Bays |
| 2016/0173371 | A1 | 6/2016 | Bays |
| 2017/0111274 | A1 | 4/2017 | Bays et al. |
| 2017/0126560 | A1 | 5/2017 | Bays et al. |
| 2018/0205645 | A1 | 9/2018 | Bays |
| 2019/0306058 | A1 | 10/2019 | Bays et al. |

FOREIGN PATENT DOCUMENTS

| | | |
|---|---|---|
| EP | 3213470 | 9/2017 |
| WO | 2013055697 | 4/2013 |
| WO | 2015065290 | 5/2015 |
| WO | 2015118874 | 8/2015 |
| WO | 2016069940 | 5/2016 |
| WO | 2016094825 | 6/2016 |
| WO | 2018049256 | 3/2018 |

OTHER PUBLICATIONS

Anonymous, "Cloud Networking: Scaling Data Centers and Connecting Users", Network Function Virtualization, Jan. 2014, 8 pages.

Anonymous, "Control Security, Connectivity, and Compliance in the Cloud", Network Function Virtualization, Brocade Vyatta VRouter for Cloud Computing, Feb. 2014, 4 pages.

ETSI, "ETSI GS NFV 001 v1.1.1 (Oct. 2013); Network Functions Virtualisation (NFV); Use Cases", ETSI, Available Online At: http://www.etsi.org/deliver/etsi_gs/nfv/001_099/001/01.01.01_60/gs_nfv001v010101p.pdf, Oct. 10, 2013, 50 pages.

Anonymous, "Ex. 1 The Basics of Real-Time Linux", Available Online at: http://www.cs.ru.nl/lab/xenomai/exercises/ex01/Exercise-1.html, Aug. 22, 2011, pp. 1-6.

Anonymous, "Multicast Routing Reference Guide, Vyatta—A Brocade Company/ Vyatta System", Brocade Vyatta 6.6R3, vol. 1, Oct. 2013, 74 pages.

Anonymous, "NAT Reference Guide, Vyatta—A Brocade Company/ Vyatta System", Brocade Vyatta 6.6R3, vol. 1, Oct. 2013, 93 pages.

Anonymous, "Open Flow Switch Specification (Version 1.3.3 (Protocol Version 0x04)", Open Networking Foundation, Sep. 27, 2013, 165 pages.

Anonymous, "Virtual CPE Anuta Networks", Available online at:https://web.archive.org/web/20141015114237/http://www.anutanetworks.com/technologies/virtual-cpe/, Oct. 15, 2014, pp. 1-2.

U.S. Appl. No. 14/262,694, "Non-Final Office Action", dated Sep. 15, 2015, 8 pages.

U.S. Appl. No. 14/262,694, "Notice of Allowance", dated Feb. 22, 2016, 7 pages.

U.S. Appl. No. 14/925,809, "Final Office Action", dated Feb. 9, 2018, 24 pages.

U.S. Appl. No. 14/925,809, "Non-Final Office Action", dated Jul. 3, 2017, 20 pages.

U.S. Appl. No. 14/925,809, "Non-Final Office Action", dated Aug. 9, 2018, 24 pages.

U.S. Appl. No. 14/966,557, "Non-Final Office Action", dated Jun. 30, 2017, 13 pages.

U.S. Appl. No. 14/966,557, "Notice of Allowance", dated Dec. 12, 2017, 10 pages.

U.S. Appl. No. 15/338,082, "Non-Final Office Action", dated Jul. 27, 2018, 6 pages.

U.S. Appl. No. 15/338,082, "Notice of Allowance", dated Nov. 21, 2018, 9 pages.

U.S. Appl. No. 15/338,082, "Restriction Requirement", May 8, 2018, 6 pages.

Americas Headquarters, "Cisco IOS XRv Router Installation and Configuration Guide", 170 West Tasman Drive San Jose, CA 95134-1706 USA, Available online at: https://www.cisco.com/en/US/docs/ios_xr_sw/ios_xrv/install_config/b_xrvr_432.pdf [retrieved on Jun. 20, 2018], Jan. 31, 2014, pp. 1-38.

EP15793991.9, "Office Action", dated Jun. 26, 2018, 9 pages.

Hintjens, "The ZeroMQ Guide—for C Developers", Available Online at: https://lqhl.me/resources/zguide-c.pdf, Jan. 5, 2016, 494 pages.

Mellah et al., "A Distributed Controller for a Virtualized Router", Journal of Internet Services and Applications, vol. 3, No. 3, Oct. 16, 2012, pp. 311-318.

Moon et al., "Bridging the Software/hardware Forwarding Divide", Technical report, University of California at Berkeley, Nov. 2010, pp. 1-15.

(56) References Cited

OTHER PUBLICATIONS

PCT/US2015/058144, "International Preliminary Report on Patentability", Jan. 26, 2017, 19 pages.
PCT/US2015/058144, "International Search Report and Written Opinion", Jan. 26, 2016, 15 pages.
PCT/US2015/058144, "Written Opinion", dated Oct. 18, 2016, 9 pages.
PCT/US2015/065290, "International Preliminary Report on Patentability", dated Feb. 23, 2017, 8 pages.
PCT/US2015/065290, "International Search Report and Written Opinion", dated Mar. 2, 2016, 12 pages.
PCT/US2015/065290, "Written Opinion", dated Nov. 9, 2016, 9 pages.
PCT/US2017/050815, "International Search Report and Written Opinion", dated Nov. 29, 2017, 17 pages.
Son, "SDN/NFV-based vCPE Services by AT&T, Verizon and KT", Available Online at:https://www.netmanias.comjen/postjblog/10363/kt-sdn-nfvjsdn-nfv-based-vcpe-services-by-at-t-verizon-and-kt, Aug. 22, 2016, pp. 1-3.
Vaghani et al., "A Comparison of Data Forwarding Schemes for Network Resiliency in Software Defined Networking", The 9th International Conference on Future Networks and Communications (FNC'14)/The 11th International Conference on Mobile Systems and Pervasive Computing (MobiSPC'14)/Affiliated Workshops, Procedia Computer Science, vol. 34, Aug. 15, 2014, pp. 680-685.
Xu, "Revisit the IP stack in Linux with Network Virtualization", DPDK Summit, Available Online at: https://dpdksummit.com/Archive/pdf/DPDK-SFSummit2014-Revisit-TheiPStackInlinuxWithNetworkVirtualization.pdf, Sep. 8, 2014, pp. 1-22.
Yang et al., "Forwarding and Control Element Separation (ForCES) Framework", Network Working Group, Request for Comments: 3746, Category: Informational, Apr. 1, 2004, pp. 1-40.

Notice of Allowance for U.S. Appl. No. 14/925,809, dated Feb. 28, 2019, 10 pages.
Notification Concerning Transmittal of International Preliminary Report on Patentability for PCT/US2017/050815, dated Mar. 21, 2019, 10 pages.
Office Action for EP 15817716.2, dated May 9, 2018, 4 pages.
Non-Final Office Action for U.S. Appl. No. 15/916,376, dated Apr. 12, 2019, 14 pages.
Jingjing, et al., "The Deployment of Routing Protocols in Distributed Control Plane of SDN", The Scientific World Journal, vol. 2014, Hindawi, 2014, pp. 1-8.
Notice of Allowance for U.S. Appl. No. 15/916,376, dated Jul. 18, 2019, 8 pages.
Non-Final Office Action mailed for U.S. Appl. No. 16/393,665 dated Dec. 12, 2019, 19 pages.
Final Office Action for U.S. Appl. No. 16/393,665 dated Mar. 25, 2020, 17 pages.
Office Action for JP 2019-513292 dated Feb. 6, 2020, 22 pages.
Takai, "Brocade vCPE Solution and VNF Management by OpenStack Tacker", SDN Japan, Brocade Communications Systems Co., Ltd. Also Available on:http://www.sdnjapan.org/2015/1523_Brocade.pdf, Jan. 15, 2016, 30 pages.
Notice of Allowance for U.S. Appl. No. 16/292,644, dated Jan. 6, 2020, 9 pages.
Corrected Notice of Allowability for U.S. Appl. No. 16/292,644, dated Feb. 19, 2020, 5 pages.
Corrected Notice of Allowability for U.S. Appl. No. 16/292,644, dated Apr. 10, 2020, 5 pages.
Non-Final Office Action for U.S. Appl. No. 16/393,665, dated Aug. 5, 2020, 24 pages.
Office Action for EP15793991.9, dated Feb. 15, 2019, 9 pages.
Office Action for EP17772528.0, dated May 12, 2020, 5 pages.
Office Action for KR10-2019-7010215, dated Apr. 1, 2020, 3 pages.

* cited by examiner

DISTRIBUTED CUSTOMER PREMISES EQUIPMENT

CROSS-REFERENCES TO RELATED APPLICATIONS

This patent application is a continuation of U.S. Non-Provisional patent application Ser. No. 16/292,644, filed Mar. 5, 2019, titled "DISTRIBUTED CUSTOMER PREMISES EQUIPMENT," which is a divisional of U.S. Non-Provisional patent application Ser. No. 15/338,082, filed Oct. 28, 2016, titled "DISTRIBUTED CUSTOMER PREMISE EQUIPMENT," which claims priority to and is a non-provisional application of U.S. Provisional Patent Application Ser. No. 62/385,352, filed Sep. 9, 2016, entitled "DISTRIBUTED CUSTOMER PREMISE EQUIPMENT." The content of U.S. Provisional Patent Application Ser. No. 62/385,352 is incorporated herein by reference in its entirety for all purposes.

U.S. Non-Provisional patent application Ser. No. 15/338,082, filed Oct. 28, 2016, titled "DISTRIBUTED CUSTOMER PREMISE EQUIPMENT," also claims priority to and is a continuation in part of U.S. Non-Provisional patent application Ser. No. 14/925,809, filed Oct. 28, 2015, titled "UNIVERSAL CUSTOMER PREMISE EQUIPMENT," which claims the benefit and priority of U.S. Provisional Application No. 62/072,971, filed on Oct. 30, 2014, titled "UNIVERSAL CUSTOMER PREMISE EQUIPMENT," U.S. Provisional Application No. 62/075,175, filed on Nov. 4, 2014, titled "UNIVERSAL CUSTOMER PREMISE EQUIPMENT," and U.S. Provisional Application No. 62/241,059, filed on Oct. 13, 2015, titled "UNIVERSAL CUSTOMER PREMISE EQUIPMENT." The content of U.S. Non-Provisional patent application Ser. No. 14/925,809, U.S. Provisional Application No. 62/072,971, U.S. Provisional Application No. 62/075,175 and U.S. Provisional Application No. 62/241,059 are incorporated herein by reference in their entirety for all purposes.

U.S. Non-Provisional patent application Ser. No. 15/338,082, filed Oct. 28, 2016, titled "DISTRIBUTED CUSTOMER PREMISE EQUIPMENT," also claims priority to and is a continuation in part of U.S. Non-Provisional patent application Ser. No. 14/966,557, filed Dec. 11, 2015, titled "MULTILAYERED DISTRIBUTED ROUTER ARCHITECTURE," which claims the benefit and priority of U.S. Provisional Application No. 62/090,627, filed Dec. 11, 2014, entitled "MULTI-LAYER ACCELERATED NETWORK ARCHITECTURE." The content of U.S. Non-Provisional patent application Ser. No. 14/966,557 and U.S. Provisional Application No. 62/090,627 are incorporated herein by reference in their entirety for all purposes.

BACKGROUND

Present disclosure generally relates to data routing and forwarding, and more specifically, to techniques for centralizing and improving control, configuration and management of customer premises equipment (CPE).

Conventionally, CPE are devices that provide hardware based solutions for facilitating certain network-based services for the customer. CPE can be any terminal/device and associated equipment located at a subscriber's premises. In some instances, the CPE is connected with a network operator's or carrier's telecommunication channel. In some instances, the CPE provides the demarcation point ("demarc") for the network operator for providing their services to the customer. In other words, the CPE acts as an extension of the network operator, residing at the customer premises and facilitates services provided by the network operator to the customer. The demarc is a point established in a building, complex or system to separate customer equipment from the equipment located in either the distribution infrastructure or central office of the network operator.

CPE may generally refer to devices such as telephones, routers, switches, residential gateways (RG), set-top boxes, fixed mobile convergence products, home networking adaptors and internet access gateways that enable consumers to access communications service providers' services and distribute them around their house or premises via a LAN (Local Area Network), digital subscriber line (DSL) or other broadband Internet routers, Voice over Internet Protocol (VoIP) base stations or other systems used by particular service providers. Also included are key telephone systems and most private branch exchanges (PBX).

Generally, once the CPE is physically located at the premises of the customer, any changes to the CPE results in a technician visit to the customer, resulting in higher costs and inconvenience. Furthermore, the CPE usually has to be replaced if a certain functionality or service is not supported by the CPE or if the CPE needs an upgrade resulting in an additional cost to the customer or the network operator. Furthermore, the CPEs are single function devices and the customer may not be able to enable and use multiple services and functionality using the same CPE.

Although, a CPE is discussed throughout the specification, in several embodiments, a router may also be used instead of a CPE to perform several embodiments discussed herein. Furthermore, in some instances, the CPE may itself perform the functions of a router, such as forwarding of network data packets. A router is a specialized network device that is configured to forward data (e.g., network data packets) between networks to facilitate the delivery of the data from its source to its intended destination. A router is configured to determine optimal routes or data paths through an internetwork topology and transport network data packets using these optimal paths. A router also provides various other services such as firewall, Quality of Service (QoS), and the like.

A conventional router typically routes network packets and comprises a control plane subsystem and one or more data plane subsystems that are all housed within a single box or chassis. Network packets may include network control packets and network data packets. Network control packets may generally refer to router (e.g., control plane server computer) generated or received packets that are used for the creation and operation of the network itself. In one example, the network control packets may update and/or configure the data plane subsystem. Network data packets may generally refer to end-device user application generated packets that are forwarded by intermediary network devices to other end-devices.

A data plane, which may be implemented as a linecard in conventional systems, is configured to receive and forward network data packets via one or more ports of the data plane. The forwarding is performed based upon forwarding information stored by the data plane. The forwarding information that a data plane uses to forward the network data packets is typically programmed by the router's control plane subsystem, which may comprise one or more management cards. The control plane subsystem is configured to control the networking-related functions performed by the router, including, for example, maintaining routing information (e.g., routing information tables), programming the data forwarding planes forwarding information based upon the routing information, handling various networking control protocols, handling the processing of packets (e.g., control and/or data packets) that are terminated at a control plane, processing Access Control Lists (ACLs), Quality of Service (QoS), management functions, and the like.

As previously indicated, in a conventional router, the control plane subsystem of the router and the data planes that are controlled by the control plane subsystem are all physically co-located within the same physical network device box or chassis of the router. As a result, there is a static relationship between the control plane subsystem and the data plane subsystems of the router. This makes programming of such routers in a large network (e.g., internet), which may comprise tens of thousands of such routers, complicated and inflexible. When changes (e.g., addition or reconfigurations of data paths, addition or removal of network devices) have to be made to such networks, each individual router box affected by the change has to be individually programmed or re-programmed. This per router-centric management requirement makes management of such networks very complex and time consuming. As a result, networks using conventional routers lack the flexibility and dynamic configurability desired by today's (and tomorrow's) network applications such as cloud computing, mobile computing, real-time and on-demand video traffic, and the like.

Therefore, maintaining a network of conventional CPEs, especially CPEs that implement routing capabilities is expensive, complex, inflexible and difficult to upgrade and manage.

BRIEF SUMMARY

Present disclosure generally relates to data routing and forwarding, and more specifically, to techniques for centralizing and improving control, configuration and management of customer premises equipment (CPE).

In certain embodiments, a novel distributed CPE is provided. According to certain embodiments, the distributed CPE includes a centralized control plane server computer and several CPEs executing software data plane subsystems natively (i.e. without virtualization). The control plane server computer executing the control plane subsystem controls the CPEs. Each CPE may also be capable of hosting virtual machines and executing virtual network functions (VNFs) in the respective virtual machines.

In certain embodiments, having a centralized control plane subsystem along with overlay networks to software data plane subsystems provides the operator with a view resembling a single large router. Also, decoupling of the control plane and data plane subsystems maximizes field utilization of hardware resources at the CPE for forwarding packets and pushes off control plane tasks that may be more processing intensive but latency insensitive (or less sensitive) tasks to a remote and centralized control plane subsystem. Furthermore, this CPE design allows for native packet processing by the software data plane subsystem, while allowing the CPE to upgrade and/or augment specific network functions using virtual network functions. Therefore, techniques disclosed allow for improved management of the network.

An example distributed customer premises equipment (CPE) may include a control plane server computer located at a first location, a first device from a plurality of devices located at a second location and a second device from the plurality of devices located at a third location. The plurality of devices may be customer premises equipment (CPE) devices. In certain embodiments, the first location is a datacenter and the second and the third location are customer premises. In certain embodiments, the control plane server computer at the first location and the first device at the second location may be connected using a network channel. In certain embodiments, a distance between the control plane server computer and the first device may be above a threshold.

The control plane server may include one or more processors and memory storing instructions executable by the one or more processors, wherein the instructions when executed, cause the control plane server computer to execute a control plane subsystem that sends network control packets using one or more network interfaces for controlling operations on a plurality of devices.

The first device may include one or more processors, memory storing instructions executable by the one or more processors, wherein the instructions when executed, cause the first device to execute a first data plane subsystem configured to forward network data packets, wherein the forwarding of the network data packets is based at least on one of the network control packets received from the control plane server computer, and instantiate a first virtual machine capable of executing a first network function. In certain embodiments, the first device comprises a host software stack stored in the memory that comprises the data plane subsystem and a hypervisor to instantiate the first virtual machine. The first network function may be a virtual network function (VNF). In certain embodiments, the first network function is f a network firewall, a network level 2 forwarding, a network level 3 forwarding, virtual private network (VPN), access control list (ACL), or a private branch exchange (PBX).

In certain embodiments, the first device may be configured to receive one or more network control packets from the control plane subsystem of the control plane server computer, instantiate a third virtual machine at the first device, or instantiate a third network function executing inside the third virtual machine at the first device, based on receiving the one or more network control packets.

In certain embodiments, the first virtual machine is instantiated by the first device, based at least on receiving one of the network control packets from the control plane server computer. In certain embodiments, the first network function is configured based on at least receiving at least one network control packet from the network control packets from the control plane server computer.

The second device may include one or more processors, memory storing instructions executable by the one or more processors, wherein the instructions when executed, cause the second device to execute a second data plane subsystem configured to forward network data packets, wherein the forwarding of the network data packets is based at least on one of the network control packets received from the control plane server computer, and instantiate a second virtual machine capable of executing a second network function.

Another example distributed customer premises equipment may include a control plane subsystem configured to execute on a first device, a first data plane subsystem configured to execute on a second device, the second device further configured to execute a first virtual machine capable of executing a first network function, a second data plane subsystem configured to execute on a third device, the third device further configured to execute a second virtual machine capable of executing a second network function, wherein the control plane subsystem is configured to control forwarding functionality of the first data plane subsystem and the second data plane subsystem, and control the first network function and the second network function.

In certain embodiments, the first device and the second device may be customer premises equipment (CPE) devices. In certain embodiments the first network function may be a virtual network function (VNF). In certain embodiments, the first network function may include one or more of a network firewall, a network level 2 forwarding, a network level 3 forwarding, virtual private network (VPN), access control list (ACL), or a private branch exchange (PBX).

In certain embodiments, the first device is configured to receive one or more network control packets from the control plane server computer, instantiate a third virtual machine at the first device, based on receiving the one or more network control packets, and instantiate a third network function executing inside the third virtual machine at the first device, based on receiving the one or more network control packets.

In certain embodiments an example method is disclosed for controlling, from a first device, forwarding functionality of a data plane subsystem configured to execute on a second device, controlling, from the first device, instantiation of a virtual machine on the second device, and controlling, from the first device, execution of a network function in the virtual machine. The method may comprises executing from a first device, a control plane subsystem for controlling the forwarding functionality, the instantiation of the virtual machine and the execution of the network function. The method may further include controlling, from the first device, forwarding functionality of a second data plane subsystem configured to execute on a third device, controlling, from the first device, instantiation of a second virtual machine on the second device, and controlling, from the first device, execution of a second network function in the second virtual machine.

In certain embodiments, an example method for forwarding network data packet may include receiving, at a first device, a network control packet from a server for altering forwarding functionality of the network data packets for the first device, altering the forwarding functionality of the first device in a data plane subsystem executing in a host software stack on the first device, receiving, at the first device, a first network data packet, forwarding the first network data packet using the data plane subsystem, receiving, at the first device, a second network data packet, and processing the second network data packet using a network function executing in a virtual machine at the first device, wherein a hypervisor from the host software stack instantiates the virtual machine. The first device may be a customer premises equipment (CPE).

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In certain embodiments, a novel distributed CPE is provided. According to certain embodiments, the distributed CPE includes a centralized control plane server computer and several CPEs executing software data plane subsystems natively (i.e., without virtualization). The control plane server computer executing the control plane subsystem controls the CPEs. Each CPE may also be capable of hosting virtual machines and executing virtual network functions (VNFs) in the respective virtual machines.

In certain embodiments, having a centralized control plane subsystem along with overlay networks to software data plane subsystems provides the operator with a view resembling a single large router. Also, decoupling of the control plane and data plane subsystems maximizes field utilization of hardware resources at the CPE for forwarding packets and pushes off control plane tasks that may be more processing intensive but latency insensitive (or less sensitive) tasks to a remote and centralized control plane subsystem. Furthermore, this CPE design allows for native packet processing by the software data plane subsystem, while allowing the CPE to upgrade and/or augment specific network functions using virtual network functions. Therefore, techniques disclosed allow for improved management of the network.

Figure 1:
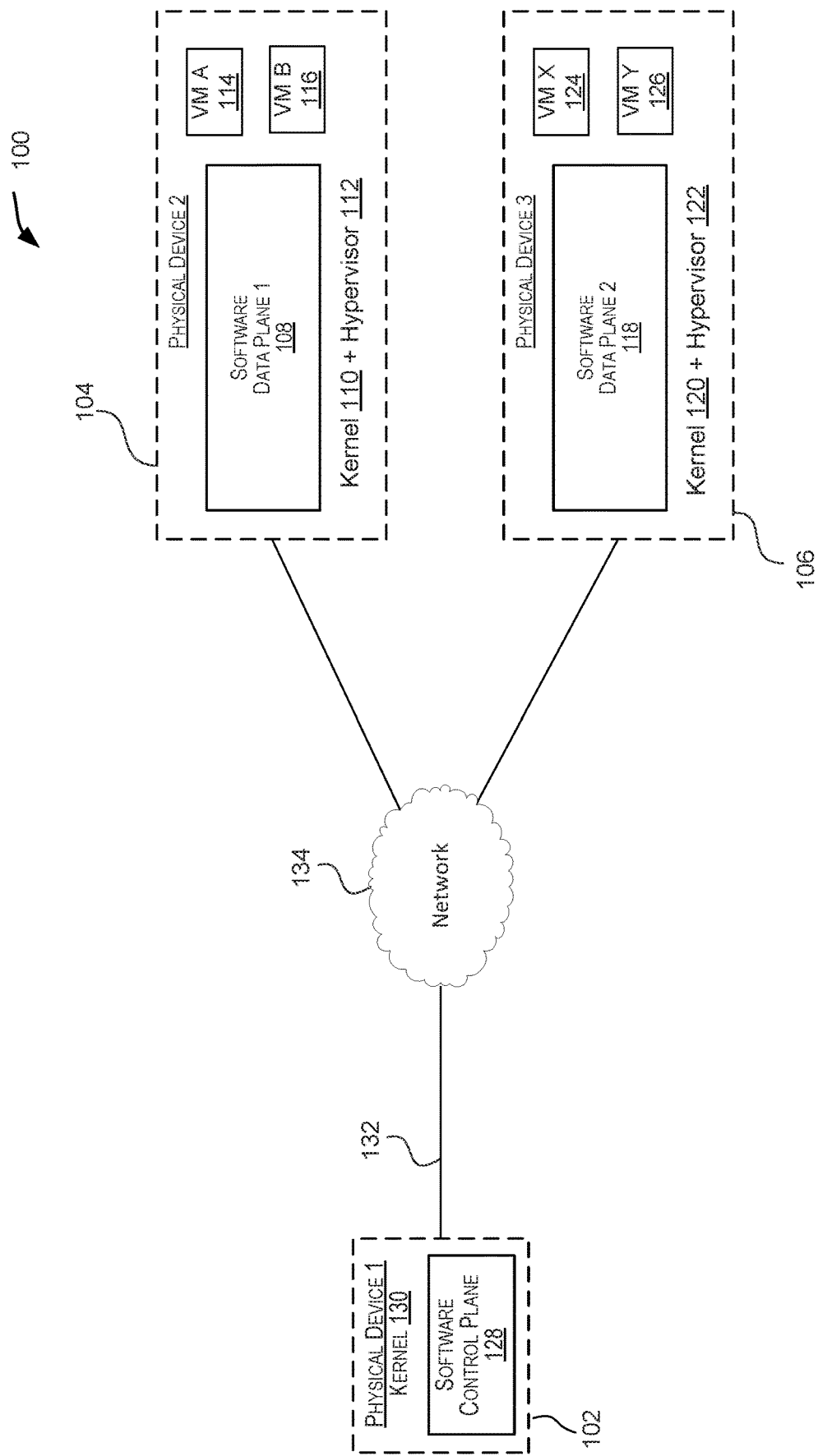
FIG. 1 is a simplified block diagram illustrating a distributed customer premises equipment according to an embodiment of the present invention.

FIG. 1 is a simplified block diagram illustrating a distributed customer premises equipment (CPE) 100 according to an embodiment of the present invention. The embodiment depicted in FIG. 1 is merely an example and is not intended to unduly limit the claimed embodiments of the present invention. One of ordinary skill in the art would recognize many variations, alternatives, and modifications. For example, in some other embodiments, the distributed CPE 100 may have more or fewer components than shown in FIG. 1, may combine two or more components, or may have a different configuration or arrangement of components. For example, the distributed CPE 100 may have more physical devices executing the software data plane subsystems than disclosed in FIG. 1 with each physical device executing one or more virtual machines to execute virtual network functions.

Distributed CPE 100 depicted in FIG. 1 includes multiple devices (e.g., 102, 104 and 106), with each device including a control plane layer or a data plane layer comprising one or more data plane subsystems. Physical devices disclosed with reference to FIG. 1 may be implemented using one or more components disclosed in FIG. 6. Distributed CPE 100 is configured to provide Layer 2 and Layer 3 (of the OSI model) routing functionality. Distributed CPE 100 may also provide functionality at Layers 4-7 of the Open Systems Interconnection (OSI) model.

In certain embodiments, the devices executing the software data plane subsystems, such as physical device 104 and physical device 106, may be referred to as customer premises equipment (CPE), customer premise equipment (CPE), universal CPE or uCPE, virtual CPE or vCPE. In certain embodiments, the system that includes the physical device 102 with the control plane subsystem 128 and a plurality of physical devices (104, 106) with the software data plane subsystems (108, 118) may be referred to collectively, herein, as the distributed CPE 100 system.

In certain embodiments, as illustrated by FIG. 1, a software control plane subsystem 128 resides in a centralized physical device 102 that communicates with several software data plane subsystems (108, 118) residing on different physical devices (104, 106), respectively. As depicted in FIG. 1, the physical device 102 comprising the software control plane subsystem 128 is able to control multiple physical devices (104, 106) comprising software data plane subsystems (108,118), respectively, in a one to many relationship. In certain embodiments, data plane subsystems controlled by the control plane subsystem 128 can be of different types, including software data plane subsystems (108, 118) and/or hardware data plane subsystems (not shown). A control plane subsystem can communicate with multiple data plane subsystems in parallel or concurrently using a network channel, such as a control channel 132 via the network 134.

In certain embodiments, these physical devices (102, 104 and 106) may be geographically dispersed. For example, the distributed CPE 100 allows distributed branch office deployments for geographies, where the software control plane subsystem 128 may reside in physical device 102 located at a central data center and the software data plane subsystems (e.g., 108, 118) may each reside on a separate physical device (e.g., 104, 106) distributed across geographies across multiple different offices (i.e., customer premises) in multiple different locations. In certain embodiments, the distance between the physical device 102 comprising the software control subsystem 128 and the physical devices (104, 106) comprising the software data plane subsystem (108, 118) may be above a certain threshold. The physical devices may be connected to each other using a wired or wireless communication network channel. In certain other embodiments, the physical devices hosting the control plane subsystems and data plane subsystems may be provisioned on a single chassis to provide an integrated multi-service platform.

As disclosed in more detail below, the physical devices (e.g., 104, 106) may also host virtual network functions (VNF). In certain instances, VNF may also be referred to as network function virtualization (NFV), and may be used interchangeably with VNF, without deviating from the scope of the disclosure. In certain embodiments, VNF may refer to a collection of programs executing in one or more virtual machines or containers to perform well-defined and programmable packet processing functions. In certain implementations, the underlying hardware (e.g., processor), operating system and/or hypervisor may support virtualization technology for hosting virtual network functions (VNF), alongside the software data plane subsystems (e.g., 108, 118). For example, physical device 104 may include a software data plane subsystem 108, an operating system kernel 110 and a hypervisor 112. The hypervisor 112 may instantiate virtual machines (VM A 114 and VM B 116) and execute network functions in the virtual machines. Similarly, physical device 106 may include a software data plane subsystem 118, an operating system kernel 120 and a hypervisor 122. The hypervisor 122 may instantiate virtual machines (VM X 124 and VM Y 126) and execute network functions in the virtual machines. In certain embodiments, the distributed CPE 100 provides native (i.e., without virtualization) data plane forwarding and/or routing functionality on the physical devices (104, 106), while using virtualization to provide flexibility of adding new functionality or augmenting existing software data plane forwarding functionality.

Although, using virtualization technology is disclosed above for supporting and hosting VNFs, in certain embodiments, VNFs may be implemented using software containers without virtualization hardware support or even a hypervisor in some instances. For example, VNFs may use unix/linux based containers facilitated by the unix/linux based kernel.

In certain embodiments, a controller (not shown) may configure the software control plane subsystem 128 at the physical device 102 using protocols such as NETCONF and/or OpenFlow.

The software control plane subsystem 128 may be configured to implement a network policy received from a controller. In one embodiment, a control plane subsystem 128 is configured to translate a policy into a set of actions that data planes subsystems (108, 118) controlled by the software control plane subsystem 128 are to take to implement the policy. The software control plane subsystem 128 is thus responsible for taking network policies received from controller and translating them to actions for software data plane subsystems (108, 118). The software control plane subsystem 128 learns which software data plane subsystems it controls when the software data plane subsystems register themselves with the software control plane subsystem 128 during their initialization phase. In certain embodiments, a control plane subsystem is externally programmable using a communication protocol such as NETCONF or OpenFlow and may be programmed using REST APIs.

The software control plane subsystems 128 may use various different communication techniques to communicate with software data plane subsystems (108, 118). In certain embodiments, as depicted in FIG. 1, the software control plane subsystem 128 uses the control channel 132 to communicate with both the software data plane subsystems (108, 118). In one embodiment, messaging over control channel 132 may use a ZeroMQ transport mechanism with JSON (JavaScript Open Notation) encapsulation. ZeroMQ (also spelled as OMQ or ØMQ or ZMQ) is a high-performance asynchronous messaging library, aimed at use in scalable distributed or concurrent applications. It provides a message queue that can run without a dedicated message broker. The library is designed to have a familiar socket-style API. It provides sockets that carry atomic messages across various transports like in-process, inter-process, TCP, and multicast. Its asynchronous I/O model enables scalable multicore applications. JSON provides a mechanism for providing a hierarchical view of the distributed network system. From the perspective of a software control plane subsystem 128, it may use the same control channel 132 and the same communication scheme when communicating with a software data plane subsystem or a hardware data plane subsystem. In this sense, the software control plane subsystem 128 does not differentiate whether it is talking to a software data plane or a hardware data plane.

For example, the software control plane subsystem 128 may receive a firewall policy configured by a user from the controller. In response, the software control plane subsystem 128 may create a data model representation for the firewall policy and store policy related information in local data structures. Software control plane subsystem 128 may then translate the data model representation into a JSON representation, which is then encapsulated into a ZeroMQ message and communicated to the various data plane subsystems using the ZeroMQ bus over control channel 132.

The software control plane subsystem 128 may also receive messages from one or more physical devices that include the data plane subsystems via the control channel 132. These messages may, for example, communicate status and state information for the data plane subsystems and/or the VNFs to the control plane subsystem. For example, if there is a change in a data plane subsystem (e.g., an interface state change), that information is encapsulated by the data plane subsystem into a JSON representation, which in turn is encapsulated into the ZeroMQ message bus and sent to the control plane subsystem 128 using control channel 132. The control plane subsystem 128 may then take actions to respond to the state change (e.g., change state information, change routes, etc.).

In certain embodiments, the physical device 102 includes an operating system kernel 130 and the software control plane subsystem 128. The operating system kernel 130 and the software control plane subsystem 128 are implemented as a set of instructions (code or program) executed by one or more processing entities such as processors provided by Intel® or AMD® or other processors. For example, the software control plane subsystem 128 may be executed by a computing system such as the one depicted in FIG. 6 and described below. In a multicore processor environment, a control plane subsystem may be executed by one or more cores of one or more processors. In a virtualized environment including one or more virtual machines executed by one or more processors, a control plane subsystem may be executed within or hosted by a virtual machine or even by a hypervisor (e.g., KVM hypervisor) or network operating system. Control plane subsystems may be deployed on bare metal, in virtual machines, and the like. Although, a software control data plane 128 is disclosed herein, in certain implementations, a hardware control data plane may be implemented without deviating from the scope of the disclosure.

The software control plane subsystems 128 is responsible for configuration and management of data plane subsystems (108, 118) and/or the VNFs. For example, the software control plane subsystem 128 is configured to maintain routing and topology information for the distributed network. This information is then used by the software control plane subsystem 128 to program one or more data plane subsystems and/or VNFs such that they are enabled to forward data packets to facilitate the delivery of the data packets from their source to their intended destination. In certain embodiments, a software control plane subsystem 128 is configured to download forwarding information to a software data plane subsystem and/or a VNF. This forwarding information is then used by the software data plane subsystem and/or the VNF to forward network data packets received by the physical device that includes the software data plane subsystem. A software control plane subsystem 128 may also download other policies-related (e.g., related to a firewall policy) information to a data plane subsystem.

There are various ways in which the control plane subsystem 128 may receive network and topology information. The control plane subsystem 128 may perform processing to support various networking protocols that exchange network and topology information between network devices. The control plane subsystem 128 may generate and process control plane packets either destined to, or originated by, other components of the distributed network system. For example, the control plane subsystem 128 may exchange topology information with each other or with other network devices or systems and construct/maintain the routing table using routing protocols such as routing information protocol (RIP), open shortest path first (OSPF) or border gateway protocol (BGP).

The software data plane subsystems (108, 118) embodied in the physical device 104 and physical device 106, respectively, represent the data forwarding layer of distributed CPE 100. For example, the distributed CPE 100 implementation may have only one or more software data plane subsystems (108, 118) executing on the respective physical devices (104, 106) and no hardware data plane subsystems.

The physical devices (104, 106) may also support virtualization technology alongside the software data plane subsystems (108, 118) for supporting additional network functions, such as virtual network functions (VNF). In certain instances, VNF may also be referred to as network function virtualization (NFV), and may be used interchangeably with VNF, without deviating from the scope of the disclosure. In certain embodiments, VNF may refer to a collection of programs executing in one or more virtual machines or containers to perform well-defined and programmable packet processing functions. In certain implementations, the underlying hardware (e.g., processor), operating system and/or hypervisor may support virtualization technology for hosting virtual network functions (VNF), alongside the software data plane subsystems (e.g., 108, 118).

Virtualization technology provides isolation between different operating environments sharing the same physical resources. In other words, virtualization provides a logical abstraction of computing resources from physical constraints. One common abstraction is referred to as a virtual machine (also known as guest), or VM, which provides the content running in the VM a direct interface to the physical hardware while maintaining the abstraction. Virtualization technology allows multiple VMs running on the same physical hardware to operate independently and isolated from each other. The one or more VMs on the system are managed by a hypervisor (also referred to as a Virtualized Machine Monitor, or VMM). The hypervisor is a software or firmware layer responsible for hosting and managing virtual machines. The hypervisor manages the system's processor, memory, and allocates other resources for each VM.

Referring back to FIG. 1, the physical device 104 may include a software data plane subsystem 108, an operating system kernel 110 and a hypervisor 112. The hypervisor 112 may instantiate virtual machines (VM A 114 and VM B 116) and execute virtual network functions in the virtual machines. Instantiating a virtual machine may include setting up the page tables and physical resources for the virtual machine, event handling for the virtual machine, and loading the virtual machine with a virtual machine image, such as a guest operating system. Similarly, physical device 106 may include a software data plane subsystem 118, an operating system kernel 120 and a hypervisor 122. The hypervisor 122 may instantiate virtual machines (VM X 124 and VM Y 126) and execute virtual network functions in the virtual machines. In certain embodiments, the distributed CPE 100 provides native (i.e., without virtualization) data plane forwarding and routing functionality on the physical devices, while using virtualization to provide flexibility of adding new functionality or augmenting existing data plane forwarding functionality using virtual network functions (VNF).

Although, using virtualization technology is disclosed above for supporting and hosting VNFs, in certain embodiments, VNFs may be implemented using software containers without virtualization hardware support or even a hypervisor in some instances. For example, VNFs can use unix/linux based containers facilitated by the unix/linux kernel.

VNF may be responsible for handling specific network functions that run in one or more virtual machines. Individual virtualized network functions can be chained or combined together in a building block-style fashion to deliver enhanced networking functionality. The hypervisor allows the physical devices (104, 106) to execute VNFs on customer premises in virtual machines, such as level 2 (L2), level 3 (L3) networking functions, firewall, virtual private network (VPN) termination, access control lists (ACLs), etc. For example, if a customer opts to run a Private Branch Exchange (PBX) on customer premise for local phone aggregation, the customer can deploy PBX as a VNF in a virtual machine hosted by the hypervisor executing in the host software stack also executing the data plane. Therefore, the physical device (aka, CPE) executing the software data plane subsystem can host and execute new and additional functionality as hosted VMs while maintaining native data plane functionality. Similarly, in certain other embodiments, other networking or other functions such as deep packet inspection (DPI) function, network analytics function, network machine learning function, or other suitable functions may be deployed as a VNF in a virtual machine on a host software stack of the CPE.

In certain instances, the software control plane subsystem 128 controls the instantiation of the virtual machine at the physical device hosting the software data plane subsystem and the hypervisor by providing instructions or control messages to the respective physical device. Furthermore, the software control plane subsystem 128 may also control instantiation of the virtual network function in the virtual machine and appropriately configure the virtual network function by providing control messages to the respective physical device. Instantiating a virtual network function may include loading and executing instructions for a network function for performing networking operations in a virtual machine. Instantiating a virtual network function may also include configuring the certain parameters and functions associated with the virtual network function.

Collectively, the physical devices (104, 106) executing the software data plane subsystems (108, 118) and VNF's hosted by the hypervisors executing on the respective physical devices are responsible for receiving data packets and forwarding the data packets to the next hop in the network based on the forwarding and configuration information received from the software control plane subsystems 128. Each physical device comprising the software data plane subsystem is programmed with forwarding information received from the software control plane subsystems. The software data plane subsystem and/or the VNFs use the forwarding information to forward data packets. In certain implementations, a software data plane subsystem and/or the VNFs supports Layer 2 and Layer 3 (of the OSI model) routing functionality. In certain embodiments, a data plane subsystem and/or VNF may also provide OSI Layers 4-7 functionality. Software data plane subsystems and/or VNFs may also provide router-related functionalities such as stateful and stateless firewalls, application flows, application logic gateways, Network Access Device (NAD) capability, and in some instances, partial or full implementations of Layer 4 routing and higher level data packet inspection capabilities, MPLS-related processing, network address translation (NAT), stateful Network Attached Storage (NAS), hierarchical QoS (Quality of Service), Q-in-Q, support for Internet Protocol Security (IPsec), Generic Routing Encapsulation (GRE), Virtual eXtensible LAN (VXLAN), various tools for analysis and management of data flows, Deep Packet Inspection (DPI), Longest Packet Match (LPM) packet lookups, Virtual Private Networks (VPNs), and other functionalities.

A software data plane subsystem (108, 118) may receive a network data packet via a port of the physical device (104, 106). The port may be a logical port or a physical port. The software data plane subsystem (108, 118) then determines how the received network data packet is to be forwarded. As part of this determination, the software data plane subsystem (108, 118) may extract information from the received data packet (e.g., extract header information), determine the source and the destination information for the network data packet from the extracted information, and then determine how the network data packet is to be forwarded based upon the extracted information, forwarding information and other applicable policies related information received by the software data plane subsystem from the software control plane subsystem 128 and stored by the software data plane subsystem (108, 118). In certain embodiments, if the software data plane subsystems (108, 118) cannot determine how a received packet is to be forwarded, then the packet is dropped. Else, the software data plane subsystem (108, 118) determines an output port to be used for forwarding the network data packet to the next hop so as to facilitate communication of the packet to its intended destination. The software data plane subsystem (108, 118) then forwards the network data packet using the determined output port.

The software data plane subsystems (108, 118), the kernels (110, 120), the hypervisors (112, 122) and the respective VNF's executing in the virtual machines are implemented as a set of instructions (or code) executed by one or more processing entities such as processors provided by Intel®, AMD®, Power, ARM, application specific integrated circuits (ASIC) or field programmable gate arrays (FPGAs), or Network Processing Units (NPUs). For example, the software data plane subsystems (108, 118) depicted in FIG. 1 may be executed by computing systems such as the one depicted in FIG. 6 and described below. Different software data plane subsystems running on different processor architectures may be controlled by the same software control plane subsystem 128.

As indicated above, a software data plane subsystem (108, 118) may also be executed by one or more NPUs. An NPU is generally a programmable multicore microprocessor that is specifically designed and optimized to handle network-related functions. Network processors are typically software programmable devices and would have generic characteristics similar to general purpose central processing units and are optimized for performing networking-related functions such as pattern matching, key lookup, computation, bits manipulation, allocation and management of buffers, etc.

Software data plane subsystems (108, 118) are configured to provide high speed data packet forwarding capabilities. In one embodiment, a software data plane subsystem (108, 118) may use a Linux-based forwarding pipeline. In another embodiment, for even faster processing, a MCEE (Multi Core Execution Environment) architecture is used, which enables network data packets to be processed in parallel at high speeds. A software data plane subsystem using the MCEE model is configured to spray the received network data packets to individual cores that are dedicated to processing those network data packets. Each core processes the network data packets it receives and then forwards the network data packets to the outbound port. Packet processing is significantly sped up using the MCEE architecture because it enables parallel processing of the network data packets and the distribution of the network data packets to a number of processing resources that are dedicated to processing the network data packets.

In such a distributed CPE 100, the physical devices (104, 106) placed on the customer premises (i.e., CPE devices) execute the software data plane subsystem (108, 118) and the hypervisor (112, 122) as part of the host software stack, but do not execute control plane functionality and instead interact with a remote and centralized physical device 102 that hosts the control plane subsystem 128. In certain embodiments, the physical devices (104, 106) placed on the customer premises (i.e., CPE devices) that executes the software data plane subsystem (108, 118) does not have a control plane subsystem. In other embodiments, the physical devices (104, 106) placed on the customer premises (i.e., CPE devices) that executes the software data plane subsystem (108, 118) may have the control plane software, but may either disable such functionality or not execute instructions associated with control plane functionality.

Figure 3:
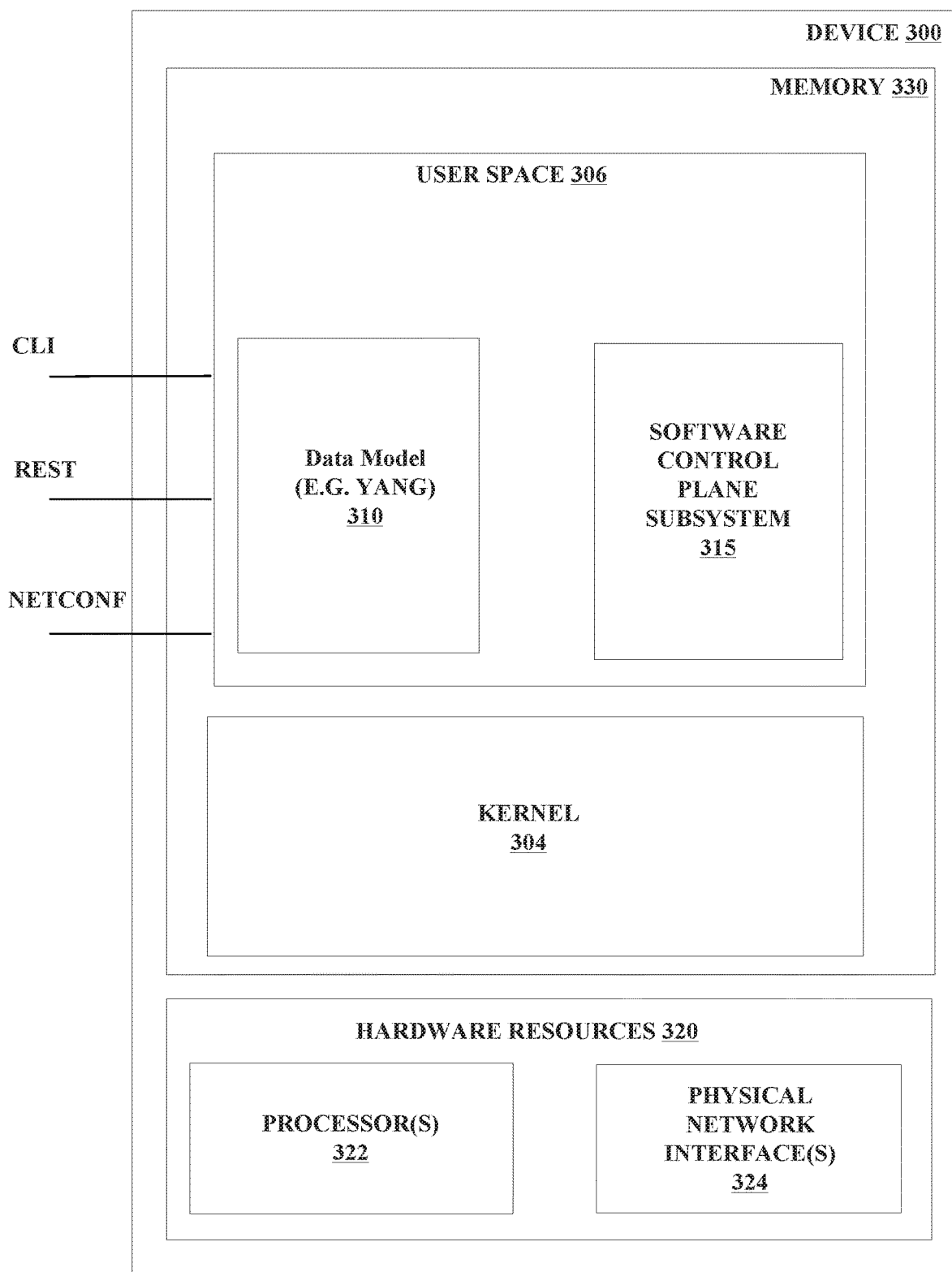
FIG. 3 is an example block diagram illustrating a physical device comprising a software control plane subsystem, according to certain embodiments of the present invention.

In certain embodiments, the absence of the control plane subsystem and/or the control plane functionality on the physical devices (104, 106) placed at the customer premises may refer to such devices (104, 106) not providing or executing key control plane functionality, such as routing protocols, MPLS, etc. and other key control plane subsystem functionality discussed in more detail in FIG. 3. In certain embodiments, the physical devices (104, 106) comprising the software data plane subsystem, may still expose a control plane system interface to the software data plane subsystem (108, 118) that provides connectivity to the control plane subsystem 128 operating on a remote physical device (102) and other remote nodes in the distributed CPE 100, without performing any key control plane subsystem functionality.

In certain embodiments, having a centralized control plane subsystem 128 along with overlay networks to software data plane subsystems provides the operator with a view resembling a single large router. Also, such decoupling of the control and data plane subsystems allows the hardware resources of the distributed equipment (i.e., CPE) to maximize field utilization of hardware resources for forwarding network data packets and pushes off control plane tasks that may be more processing intensive but latency insensitive (or less sensitive) tasks to a remote and centralized control plane subsystem. The centralized control plane subsystem can control multiple software data plane subsystem operating in multiple CPEs.

In certain embodiments, certain aspects disclosed may also support augmenting functionality of a native software data plane subsystem on a device, such as a CPE, with a new data plane subsystem. For example, the host software stack using the hypervisor may install a new data plane subsystem in the virtual machine and service chain network data packets between the physical network and the new data plane in the virtual machine using the native data plane subsystem. In certain embodiments, the hypervisor is in the linecard and several such linecards are distributed functions throughout the network.

Centralizing the control plane functionality also allows for consolidation/aggregation of the control plane functionality while continuing to provide distributed data plane functionality for fast forwarding at the individual CPE devices. This also facilitates easy configuration of the network and maintaining a fleet of distributed devices, since the control for all those distributed CPE devices is centralized. A single instruction at the software control plane subsystem can be interpreted and disseminated to all the relevant software data plane subsystems operating on the individual CPEs.

In certain embodiments, this enables Software as a Service model where the administrator can do interconnected branches and SP LAN functionality in addition to local service function chaining all through a distributed router interface that is pulled up through one control plane subsystem interface at the data center.

In certain embodiments, the orchestration layer may provide a single visualization of the system that looks like one router with distributed functionality, where the software control plane subsystem 128 for that router is running in the data center and then the software data plane subsystems and the hypervisors that support virtual machines and VNF functionality are running on individual devices, such as CPEs. For example, if the administrator logged in and looked at interfaces, the physical eth 0 interface might be in Austin and eth 1 interface might be in Denver, whereas the control plane subsystem itself might be executing in San Jose, Calif.

Figure 2:
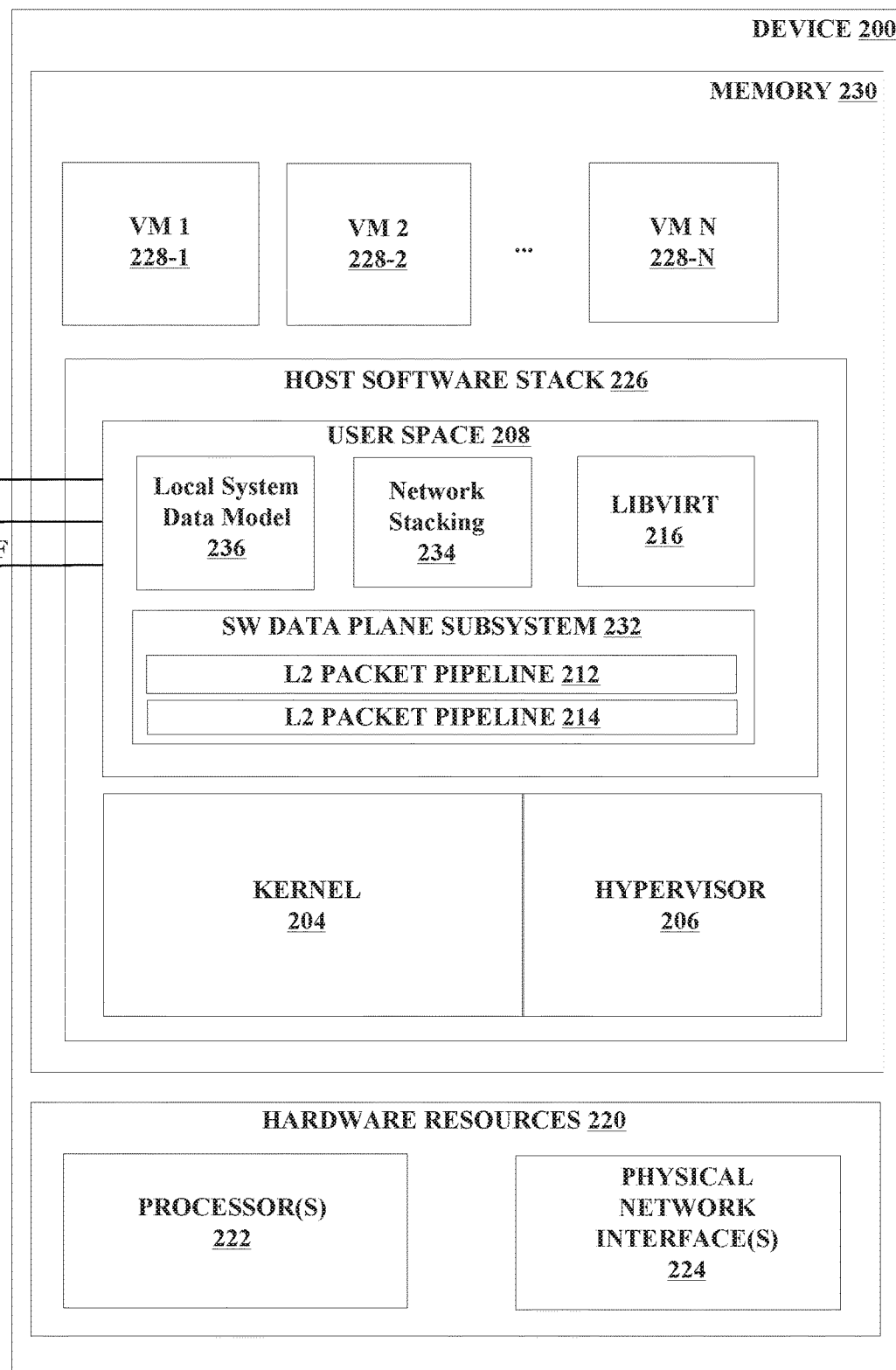
FIG. 2 is an example block diagram illustrating a physical device comprising a software data plane subsystem, according to certain embodiments of the present invention.

FIG. 2 is an example block diagram illustrating a physical device 200 comprising a software data plane subsystem, according to certain aspects of the disclosure. For example, physical device 200, illustrates an example physical device 104 or 106 of FIG. 1. Device 200 may be an example CPE device of the distributed CPE 100. As shown in FIG. 2, the device 200 may include memory 230 and hardware resources 220. The hardware resources 220 may include, but are not limited to one or more processors 222 and physical network interfaces 224. Several other components disclosed with respect to FIG. 6 may be employed in implementing device 200. The physical network interfaces 224 may provide the physical ports for transmitting and receiving network data and control packets at the device 200. In other words, the physical network interface 224 is the point of interconnection between the device 200 and a private or public network (e.g., 134). For example, an Ethernet port may be a physical network interface. The one or more processors 222 from the hardware resources 220 may load a host software stack 226 into memory 230 from a storage device 625 and/or the network for performing operations associated with network data packet forwarding.

The memory 230 may be logically partitioned into several regions, including operating system kernel space (or kernel) 204 and the user space 208. Instructions loaded from the kernel space 204, when loaded in the one or more processors 222 may execute in kernel mode. Similarly, instructions loaded from the user space 208, when loaded in the one or more processors 222 may execute in the user mode. Instructions executing from the kernel 204 in kernel mode may in some instances have higher privilege and may be able to execute privileged instructions, such as manipulating certain control registers associated with the processor.

In certain embodiments, a hypervisor 206 may be implemented, added or run in conjunction with the kernel 204 as part of the host software stack 226 to support a virtualized environment, as previously discussed. In such an environment, the kernel 204, the hypervisor 206 and software components executing as part of the user space 208 may be considered part of the host software stack 226. As illustrated in FIG. 2, the hypervisor 206 executing on the device 200 from memory 230, may manage several virtual machines, such as VM 1 (228-1), VM 2 (228-2) and VM N (228-N) (for simplicity, also collectively referred to as VMs 228) for hosting VNFs.

In certain embodiments, the CPE 200 may have a hardware supported virtualized environment or a software based virtualization environment (i.e., emulation) using Kernel based virtual machine (KVM) and/or Quick Emulator (Qemu). For example, KVM may allow virtualization of name spaces and virtualization of resources supported by the processor virtualization. On the other hand, Qemu emulates resources that the processor/kernel doesn't virtualize. For example, the Qemu emulates the networking interface card (NIC) interfaces.

In certain embodiments, LibVirt 216 is used as an additional layer between the hypervisor 206 and the VMs 228. In certain embodiments, LibVirt 216 may provide application programmable interfaces (APIs) into the Qemu. LibVirt 216 also provides a toolset for managing virtualization functions, such as starting, stopping and managing VMs. In addition, in certain embodiments, according to aspects of the disclosure, LibVirt 216 commands are exposed by the device 200 so that VMs 228 can be managed remotely by the software control plane subsystem 128. In certain instances, protocols such as Open Stack may be used by the software control plane subsystem 128 for managing VMs 228 directly through the LibVirt 216 APIs.

A network data packet received at a physical network interface 224 at the kernel is processed in the kernel space by the Ethernet driver. The networking stack of the kernel may perform net filtering, routing and then send out the processed packet through a different physical network interface. However, in certain implementations, several aspects of the device 200 that support the networking infrastructure may be implemented as part of the user space 208 to increase the responsiveness of the system. For example, the software data plane subsystem 232 may be implemented in the host software stack 226 in the user space 208. In one example implementation, the software data plane subsystem 232 may implement example L2 packet processing pipeline 212 and L3 packet processing pipeline 214. The kernel 204 may facilitate the functions provided by the software data plane subsystem 232. For example, in one implementation, the kernel 204 may execute shadow interface drivers from the kernel 204. These shadow interface drivers may take packets and move them to the user space packet pipelines (blocks 212 and 214) for the software data plane subsystem 232, while incurring negligible costs to the kernel performance. In user space 208 in the software data plane subsystem 232, the packet may be processed using real-time threads executing on a processor or processing core. A real-time thread may execute using either higher priority than other threads or tasks or may be assigned dedicated resources. In certain implementations, assigning a real-time thread to a particular task, such as processing a network data packet, may result in assigning a physical core to the processing of that thread, resulting in a relatively jitter free and prioritized processing of the network data packet.

According to aspects of the disclosure, certain networking functions are handled by the software data plane subsystem 232 in user space 208 of the host stack software 226. Such an implementation allows flexibility for a distributed CPE 100, where after deployment of the device 200 to the customer premise, the device 200 can provide routing functionality using the native routing capabilities implemented as part of the software data plane subsystem 232 in the host software stack 228 or can augment or replace the network functionality by providing routing capabilities in the VMs 228.

In certain embodiments, the device 200 may include a networking stack 234 that provides connectivity to the control plane subsystem 128 operating on a remote physical device 102 and other remote nodes in the distributed CPE 100. The networking stack 234 provide basic networking functionality for device 200 such as getting addresses allocated using dynamic host configuration protocol (DHCP), remotely sourcing the data plane subsystem startup process, and connecting the device 200 to the physical device comprising the control plane subsystem. The networking stack 234 does not perform such as routing protocols, MPLS, etc. and other key control plane subsystem functionality discussed in more detail in FIG. 3, and merely provides connectivity to the remote systems.

In certain embodiments, the device 200 may include a local system data model 236 that may sequester state resulting from all new commands received, either directly using a command line interface (CLI) or remotely from a control plane subsystem 128 using protocols such as representational state transfer (REST) and NETCONF. In certain embodiments, the local system data model 236 may manage/configure local parameters and functions such as user credentials, ssh service (to enable remote access to nodes), and configuration for local interfaces. In certain embodiments, the local system data model 236 may cache or maintain a partial view of the data model managed by the physical device comprising the control plane subsystem.

It is to be noted that in such a distributed CPE 100, the device 200 placed on the customer premises executes the software data plane subsystem 232 and the hypervisor 206 as part of the host software stack 226, but does not execute control plane functionality and instead interacts with a remote and centralized physical device 102 that hosts the control plane subsystem 128. In certain embodiments, the device 200 placed on the customer premises that executes the software data plane subsystem 232 does not have a control plane subsystem. In other embodiments, the device 200 that executes the software data plane subsystem 232 may have the control plane software, but may either disable such functionality or not execute instructions associated with control plane functionality.

In certain embodiments, the absence of the control plane subsystem and/or the control plane functionality on the physical device 200, as described above, may refer to not providing or executing key control plane functionality, such as routing protocols, MPLS, etc. and other key control plane subsystem functionality discussed in more detail in FIG. 3.

FIG. 3 is an example block diagram illustrating a physical device 300 comprising a software control plane subsystem, according to certain aspects of the disclosure. For example, physical device 300, illustrates an example physical device 102 of FIG. 1. As shown in FIG. 3, the device 300 may include memory 330 and hardware resources 320. The hardware resources 320 may include, but are not limited to one or more processors 322 and physical network interfaces 324. Several other components disclosed with respect to FIG. 6 may be used in implementing device 300. The physical network interfaces 324 may provide the physical ports for transmitting and receiving network control packets at the device 300. In other words, the physical network interface 324 is the point of interconnection between the device 200 and a private or public network (e.g., 314). For example, an Ethernet port may be a physical network interface. In certain embodiments, the one or more processors 322 from the hardware resources 320 may load kernel 304, data model 310 and software control plane subsystem 315 into memory 330 from a storage device 625 and/or the network for performing operations associated with network data packet forwarding. In certain implementations, at least portions of the data model 310 and the software control plane subsystem 315 may be implemented in user space 306.

In certain embodiments, the device executing the control plane, also referred to as control plane server computer, may implement a data model 310 to maintain a unified and centralized view of all the physical devices with software data plane subsystems, such as CPE distributed. The data model 310 may sequester the state resulting from all new commands received via different command interfaces, either directly using a command line interface (CLI) or remotely from a controller using protocols such as representational state transfer (REST) and NETCONF. Using such operational mode commands, the state of the distributed CPE 100 may be maintained at the control plane server computer in the data model 310.

In one implementation, the data model 310 may be implemented using the yet another next generation (YANG) model. YANG is a data modeling language for NETCONF. YANG can be used to model both configuration data as well as state data of network elements. Furthermore, YANG can be used to define the format of event notifications emitted by network elements. Therefore, a data model 310 implemented using YANG allows the distributed CPE 100 the ability to maintain the transitional and static state using a unified model. Implementation of such a unified data model 310 allows for better synchronization of various data elements in the system.

The software control plane subsystem 315 may be coupled to the data model 310 and configured to implement a command or network policy received from controller. In one embodiment, the software control plane subsystem 315 may be responsible for taking network policies received from controller and translating them to actions for data plane subsystems (108, 118). The software control plane subsystem 315 learns which software data plane subsystems it controls when the software data plane subsystems register themselves with the software control plane subsystem 315 on their initialization.

The software control plane subsystems 315 may use various different communication techniques to communicate with data plane subsystems (108, 118). In certain embodiments, as depicted in FIG. 1, the software control plane subsystem 315 uses the control channel 132 to communicate with both the software data plane subsystems (108, 118). In one embodiment, messaging over control channel 132 may use a ZeroMQ transport mechanism with JSON (JavaScript Open Notation) encapsulation. ZeroMQ (also spelled as OMQ or ØMQ or ZMQ) is a high-performance asynchronous messaging library, aimed at use in scalable distributed or concurrent applications. It provides a message queue that can run without a dedicated message broker. The library is designed to have a familiar socket-style API. It provides sockets that carry atomic messages across various transports like in-process, inter-process, TCP, and multicast. Its asynchronous I/O model enables scalable multicore applications. JSON provides a mechanism for providing a hierarchical view of the distributed network system.

For example, the data model 310 may receive a firewall policy configured by a user from the controller and create a data model representation for the firewall policy and store policy related information in the data model 310. Software control plane subsystem 315 may then translate the data model representation into a JSON representation, which is then encapsulated into a ZeroMQ message and communicated to the various data plane subsystems using the ZeroMQ bus over control channel 132.

The software control plane subsystem 315 may also receive messages from the data plane subsystems via the control channel 132. These messages may, for example, communicate status and state information for the data plane subsystems and/or the VNFs to the software control plane subsystem 315. For example, if there is a change in a software data plane subsystem (e.g., an interface state change), that information is encapsulated by the software data plane subsystem into a JSON representation, which in turn is encapsulated into the ZeroMQ message bus and sent to the control plane subsystem 315 using control channel 132. The control plane subsystem 315 may then take actions to respond to the state change (e.g., update data model 310, change routes, etc.).

In certain embodiments, the control plane server computer 300 includes an operating system kernel 304, logic for the data model 310 and the software control plane subsystem 315. The operating system kernel 304, logic for the data model 310 and the software control plane subsystem 315 are implemented as a set of instructions (code or program) executed by one or more processing entities such as processors provided by Intel® or AMD® or other processors. For example, the control plane subsystem 128 may be executed by a computing system such as the one depicted in FIG. 6 and described below. In a multicore processor environment, a control plane subsystem may be executed by one or more cores of one or more processors. In a virtualized environment including one or more virtual machines executed by one or more processors, the software control plane subsystem 315 may be executed within or hosted by a virtual machine or even by a hypervisor (e.g., KVM hypervisor) or network operating system. Although a software control data plane 315 is disclosed herein, in certain implementations, a hardware control data plane may be implemented without deviating from the scope of the disclosure.

The software control plane subsystems 315 is responsible for configuration and management of data plane subsystems (108, 118) and the VNFs. For example, the control plane subsystem 315 is configured to maintain routing and topology information for the distributed network. This information is then used by the control plane subsystem to program one or more data plane subsystems and/or VNFs such that they are enabled to forward data packets to facilitate the delivery of the data packets from their source to their intended destination. In certain embodiments, a software control plane subsystem 315 is configured to download forwarding information to a software data plane subsystem or a VNF. This forwarding information is then used by the data plane subsystem and/or the VNF to forward data packets received by the physical device that includes the software data plane subsystem. A software control plane subsystem 315 may also download with other policies-related (e.g., related to a firewall policy) information to a data plane subsystem.

There are various ways in which the software control plane subsystem 315 may receive network and topology information. The software control plane subsystem 315 may perform processing to support various networking protocols that exchange network and topology information between network devices. The software control plane subsystem 315 may generate and process control plane packets either destined to, or originated by, other components of the distributed network system. For example, the control plane subsystem 315 may exchange topology information with each other or with other network devices or systems and construct/maintain the routing table using routing protocols such as routing information protocol (RIP), open shortest path first (OSPF) or border gateway protocol (BGP).

Centralizing the control plane functionality, using the data model 310 and the bifurcation of the software control plane subsystem 315 and the software data plane subsystem 232, also allows for consolidation/aggregation of the control plane functionality while continuing to provide distributed data plane functionality for fast forwarding at the individual data forwarding devices, such as CPEs. This also facilitates easy configuration of the network and maintaining a fleet of distributed devices, since the control for all those distributed devices is centralized at the control plane server computer. A single instruction at the control plane subsystem can be interpreted and disseminated to all the relevant data plane subsystems operating on the individual CPEs.

In certain embodiments, this enables Software as a Service model where the administrator can do interconnected branches and SP LAN functionality in addition to local service function chaining all through a distributed router interface that is pulled up through one control plane subsystem interface at the data center.

Figure 4:
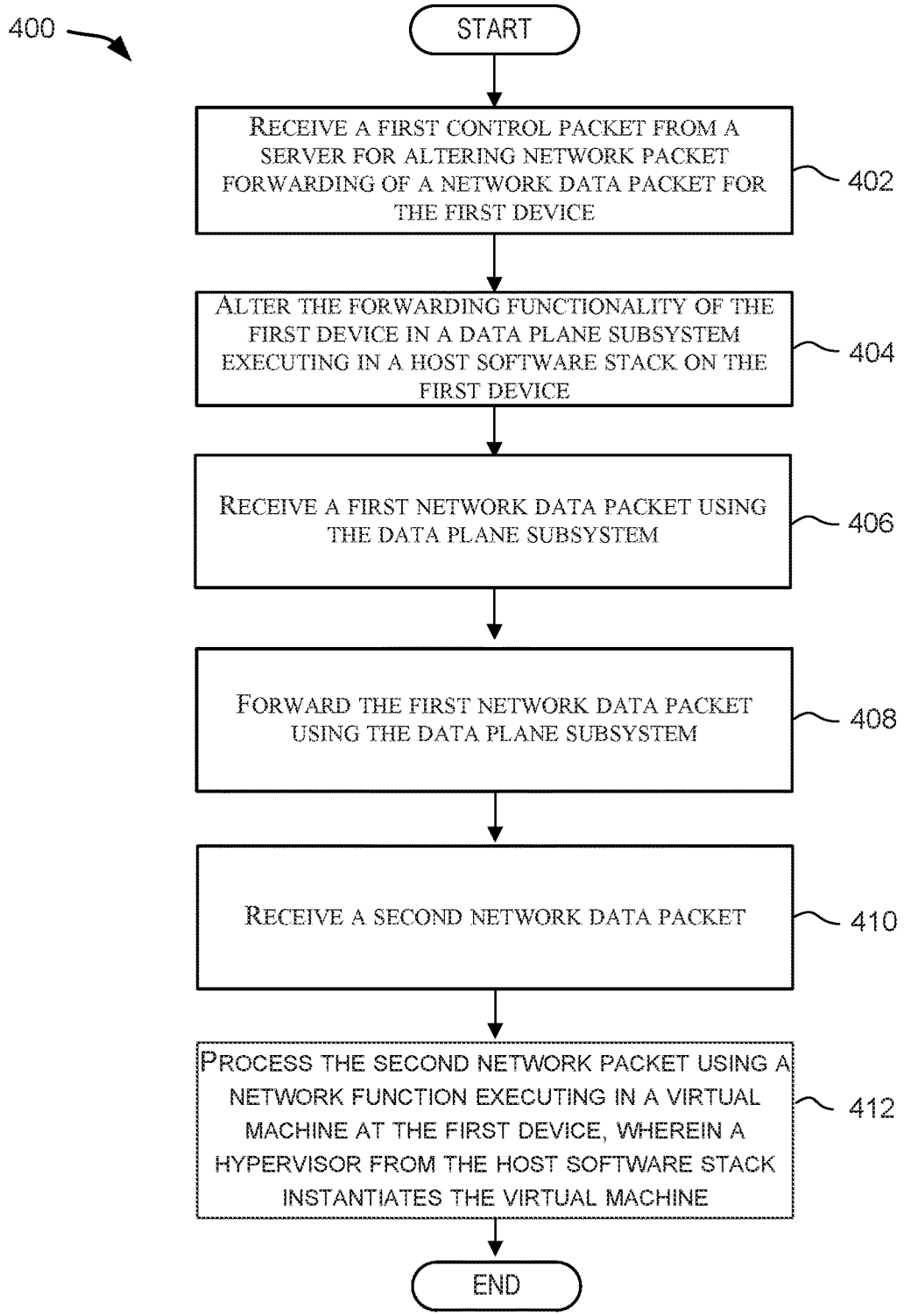
FIG. 4 is a flow diagram illustrating a method for performing embodiments of the invention according to one or more illustrative aspects of the disclosure.

In certain embodiments, the control plane server computer may also host an orchestration layer (not shown) that may provide a single visualization of the system that looks like one router with distributed functionality, where the software control plane subsystem for that router is running in the data center and then the software data plane subsystems and the hypervisors that support virtual machines and VNF functionality are running on individual FIG. 4 is a flow diagram illustrating a method 400 for performing embodiments of the invention according to one or more illustrative aspects of the disclosure. According to one or more aspects, any and/or all of the methods and/or method steps described herein may be implemented by and/or in a physical device 104 (or device 106), device 200 or computer system 600. In one embodiment, one or more of the method steps described below with respect to FIG. 4 are implemented by one or more processors of a computing system 600, such as the processors 610 or another processor. Additionally or alternatively, any and/or all of the methods and/or method steps described herein may be implemented in computer-readable instructions, such as computer-readable instructions stored on a computer-readable medium such as the memory 635, storage 625 or another computer-readable medium.

At block 402, components of the device may receive a first network control packet for altering network data packet forwarding of a network data packet for the first device. In certain embodiments, the device may be placed at a customer premises and may be referred to as a CPE device. Network control packets may generally refer to network device (e.g., control plane server computer) generated or received packets that are used for the creation and operation of the network itself. In one example, the network control packets may update and/or configure the data plane subsystem and/or the VNFs executing on the device. Examples protocols that use network control packets include, but are not limited to ARP, BGP, OSPF, and other protocols that control the network together.

At block 404, components of the device may alter forwarding functionality of the device in a data plane subsystem executing in a host software stack on the first device.

At block 406, the device may receive a first network data packet. Network data packets may generally refer to end-device user application generated packets that are forwarded by intermediary network devices to other end-devices. From the perspective of the network device, network data packets always have a transit destination internet protocol (IP) address and are routed using the destination IP address-based forwarding processes of the data plane subsystem.

At block 408, the device may forward the first network data packet using the data plane sub system.

At block 410, the device may receive a second network data packet. At block 412, the device may process the second network data packet using a network function executing in a virtual machine at the first device, wherein a hypervisor from the host software stack instantiates the virtual machine. In certain implementations, implementing a network function may include implementing network nodes or functionality.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Figure 5:
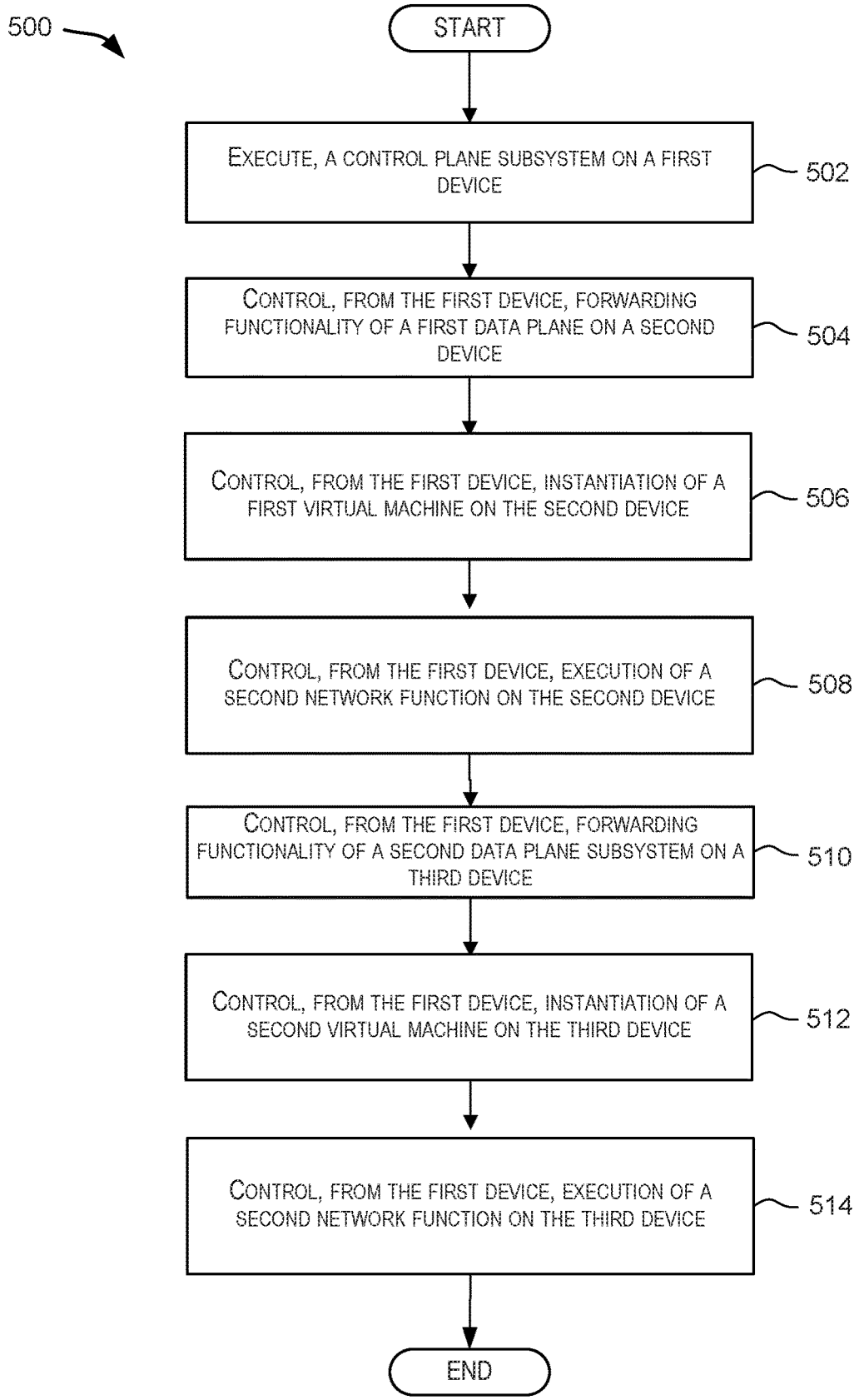
FIG. 5 is another flow diagram illustrating a method for performing embodiments of the invention according to one or more illustrative aspects of the disclosure.

FIG. 5 is a flow diagram illustrating a method 500 for performing embodiments of the invention according to one or more illustrative aspects of the disclosure. According to one or more aspects, any and/or all of the methods and/or method steps described herein may be implemented by and/or in a physical device 102, device 300 or computer system 600. In one embodiment, one or more of the method steps described below with respect to FIG. 5 are implemented by one or more processors of a computing system 600, such as the processors 610 or another processor. Additionally, or alternatively, any and/or all of the methods and/or method steps described herein may be implemented in computer-readable instructions, such as computer-readable instructions stored on a computer-readable medium such as the memory 635, storage 625 or another computer-readable medium.

At block 502, the first device, such as a control plane server computer, may execute a control plane subsystem. In certain embodiments, the control plane subsystem may be a software control plane subsystem with instructions loaded from a storage device in memory and executed on one or more processors. The first device may provide an interface to the overlay network that includes the control plane server computer and several other device, such as CPE device. Collectively, all the devices may represent a distributed CPE.

At block 504, the first device may control forwarding functionality of a first software data plane subsystem configured to execute on a second device. In some scenarios, the second device is placed at a customer premise and may be referred to as a CPE. In certain implementations, the first device may execute a first software control plane subsystem that controls the data plane subsystem on the second device by sending network control packets to the second device. Network control packets may generally refer to network device generated or received packets that are used for the creation and operation of the network itself. From the perspective of the network device, network control packets always have a receive destination IP address and are handled by the CPU in the network device route processor. In one example, the network control packets may update and/or configure the data plane subsystem and/or the VNFs executing on the device. Examples protocols that use network control packets include, but are not limited to, ARP, BGP, OSPF, and other protocols that control the network together.

At block 506, the first device may also control instantiation of a first virtual machine on the second device. In certain embodiments, components of the first device support virtualization technology. For example, the first device may include a processor that supports virtualization and execute a hypervisor for enabling instantiation and management of the virtual machines. Virtual machines may provide an isolated environment for the execution of certain functions.

At block 508, the first device may control execution of a first network function in the first virtual machine executing on the second device. A network function may refer to a virtual network function. A virtual network function may include any network functions executed in the virtual machines that enhances or augments the network capabilities of the second device. Examples of VNFs may include, but are not limited to, level 2 (L2), level 3 (L3) networking functions, firewall, virtual private network (VPN) termination, access control lists (ACLs), deep packet inspection (DPI) function, network analytics function, network machine learning function, etc.

At block 510, the first device may control forwarding functionality of a second software data plane subsystem configured to execute on a third device. In some scenarios, the second device is placed at a customer premise and may be referred to as a CPE.

At block 512, the first device may also control instantiation of a second virtual machine on the third device. In certain embodiments, components of the first device support virtualization technology. For example, the first device may include a processor that supports virtualization and execute a hypervisor for enabling instantiation and management of the virtual machines.

At block 514, the first device may control execution of a second network function in the virtual machine executing on the third device.

In certain embodiments, the first second and third device may together be referred to as a distributed CPE or distributed CPE system. The first device, also referred to as the control plane server computer may include a software control plane subsystem and provide a unified interface and network overlay to interact with the various devices in the network executing software data plane subsystems. Each of the devices executing the software data plane subsystems may also support virtualization and execute a hypervisor to instantiate virtual machines. Each of the devices may also execute VNFs in the virtual machines.

The distributed CPE may provide a highly unified, but scalable and flexible network environment that allows centralized modeling and control of the network, while providing the ability to replace and augment data plane functionality at each of the physical devices (or CPEs) comprising the software data plane subsystems by chaining in VNFs using virtualization.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Figure 6:
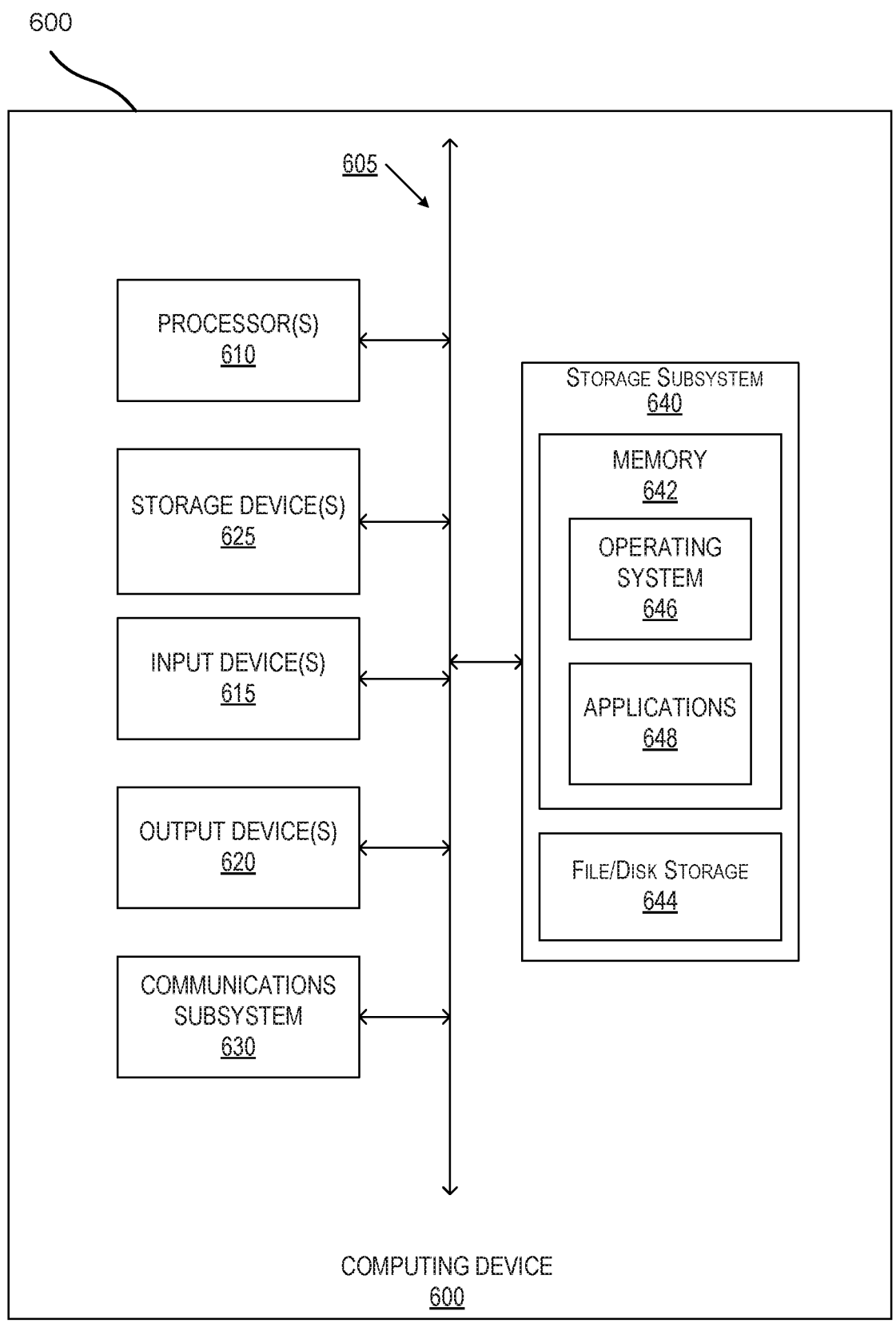
FIG. 6 is a simplified block diagram of a computing system or device that may be used to execute various components of a distributed router according to one or more aspects of the disclosure.

FIG. 6 is a simplified block diagram of a computing system or device 600 that may be used to execute various components or subsystems of a distributed router according to an embodiment of the present invention. In some embodiments, computing system 600 is configured to implement any of the methods described above. For example, one or more computer systems like computer system 600 may be used to execute one or more subsystems of a distributed router such as controller 102, one or more control plane subsystems 104, and one or more software data plane subsystems 108.

Computer system 600 can be of various types including, without limitation, a personal computer, a portable computer, a workstation, a network computer, a mainframe, a kiosk, a PDA, a cell phone, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Computer system 600 is shown comprising hardware elements that can be electrically coupled via a bus 605. The hardware elements may include one or more processors 610, one or more input devices 615, one or more output devices 620, a communications subsystem 630, and a storage subsystem 640. Bus subsystem 605 provides a mechanism for letting the various components and subsystems of computer system 600 communicate with each other as intended. Although bus subsystem 605 is shown schematically as a single bus, alternative embodiments of the bus subsystem may utilize multiple busses.

Processors 610 represent the processing resources of computer system 600 and may include without limitation one or more general-purpose processors and/or one or more special-purpose processors (such as digital signal processing chips, graphics acceleration processors, and/or the like). Processors 610 may include one or more multicore processors.

Input devices 615 may include one or more different mechanisms for providing inputs to computer system 600 such as, without limitation, a mouse, a keyboard, a touchpad, a tablet, and/or the like. Output devices 620 may include one or more different mechanisms for outputting information from computer system 600 such as, without limitation, a display unit, a printer, and/or the like.

Computer system 600 may also include a communications subsystem 630, which facilitates communications to and from computer system 600. Communications subsystem 630 can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. Communications subsystem 630 may permit data to be exchanged with a network, other computer systems, and/or any other devices described herein. In certain embodiments, communications subsystem 630 may include forwarding hardware that is used to implement a hardware data plane according to the teachings above.

Storage subsystem 640 provides a non-transitory medium for storing information and code (instructions) that can be executed by one or more processors 610. For example, storage subsystem 640 may be configured to store the basic programming and data constructs that provide the functionality of embodiments of the present invention. According to an embodiment of the present invention, software code instructions or modules implementing the functionality of the present invention may be stored in storage subsystem 640. These software modules may be executed by processor(s) 610. Storage subsystem 640 may also provide a repository for storing data used in accordance with the present invention. Storage subsystem 640 may comprise a memory subsystem 642 and a file/disk storage subsystem 644.

Memory subsystem 642 may include a number of memories such as a main random access memory (RAM) for storage of instructions and data during program execution, a read only memory (ROM) in which fixed instructions are stored, flash memory, and the like. Various software elements may be located within system memory 642 such as an operating system 646, device drivers, executable libraries, and/or other code, such as one or more application programs 648, which may comprise computer programs provided by various embodiments, and/or may be designed to implement methods, and/or configure systems, provided by other embodiments, as described herein.

File storage subsystem 644 provides persistent (non-volatile) storage for program and data files, and may include a hard disk drive, a floppy disk drive along with associated removable media, a Compact Disk Read Only Memory (CD-ROM) drive, an optical drive, removable media cartridges, local and/or network accessible storage, and other like storage media.

The terms "machine-readable medium" and "computer-readable medium," as used herein, refer to any non-transitory medium that participates in providing data that causes a machine to operate in a specific fashion. In an embodiment implemented using the computer system 600, various computer-readable media might be involved in providing instructions/code to processor(s) 610 for execution and/or might be used to store such instructions/code. Computer-readable medium may take many forms such as non-volatile media and volatile media.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although certain embodiments have been described using a particular series of transactions and steps, it should be apparent to those skilled in the art that the scope of the present invention is not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software are also within the scope of the present invention. Certain embodiments of the present invention may be implemented only in hardware, or only in software (e.g., code programs, firmware, middleware, microcode, etc.), or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation such as by executing computer instructions or code, or any combination thereof. Processes can communicate using a variety of techniques, including but not limited to, conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    executing, by a computer system comprising one or more processors and located at a first location, a control plane subsystem to cause sending a plurality of network control packets using one or more network interfaces for controlling network data packet forwarding operations performed by a plurality of devices, the plurality of devices including a first device at a second location and a second device at a third location,
    wherein the plurality of network control packets comprises a first set of network control packets received at the first device, the first set of network control packets causing a first data plane subsystem executed by the first device to forward a first set of network data packets based upon at least one of the first set of network control packets, and wherein the plurality of network control packets comprises a second set of network control packets received at the second device, the second set of network control packets causing a second data plane subsystem executed by the second device to forward a second set of network data packets based upon at least one of the second set of network control packets.

2. The method of claim 1, wherein the plurality of devices are customer premises equipment devices.

3. The method of claim 1, wherein the first device further instantiates a first virtual machine capable of executing a first network function comprising a virtual network function.

4. The method of claim 3, wherein the first virtual machine is instantiated based on receiving one of the network control packets from the control plane subsystem.

5. The method of claim 3, wherein the first network function is one or more of a network firewall, a network level 2 forwarding, a network level 3 forwarding, virtual private network, access control list, or a private branch exchange.

6. The method of claim 3, wherein the first network function is configured based on at least receiving at least one network control packet from the network control packets.

7. The method of claim 1, wherein the first device:
receives one or more network control packets from the control plane subsystem;
instantiates a third virtual machine at the first device; and
instantiates a third network function executing inside the third virtual machine at the first device, based on receiving the one or more network control packets.

8. The method of claim 1, wherein the first location is a datacenter and the second location is a customer premises.

9. A system comprising:
a first device comprising a first processor configured to execute instructions to provide a control plane subsystem; and
a first data plane subsystem executed by a second device, the second device further configured to execute instructions on a second processor with virtualization technology support to provide a first virtual machine capable of executing a first network function,
wherein the control plane subsystem is configured to control forwarding functionality of the first data plane subsystem and a second data plane subsystem, wherein the second data plane subsystem is executed by a third device, the third device further configured to execute instructions on a third processor with the virtualization technology support to provide a second virtual machine that is capable of executing a second network function, and wherein the control plane subsystem is configured to control the first network function and the second network function.

10. The system of claim 9, wherein the first device and the second device are customer premises equipment devices.

11. The system of claim 9, wherein the first network function is a virtual network function.

12. The system of claim 9, wherein the first network function is one or more of a network firewall, a network level 2 forwarding, a network level 3 forwarding, virtual private network, access control, or a private branch exchange.

13. The system of claim 9, wherein the first device:
receives one or more network control packets from the control plane subsystem;
instantiates a third virtual machine at the first device, based on receiving the one or more network control packets; and
instantiates a third network function executing inside the third virtual machine at the first device, based on receiving the one or more network control packets.

14. A method for routing packets, the method comprising:
sending network control packets using one or more network interfaces for controlling operations on a plurality of devices;
receiving, at a first data plane subsystem, a first set of network control packets of the network control packets;
forwarding, on the first data plane subsystem, a first set of network data packets, wherein the forwarding is based at least on the network control packets;
instantiating a first virtual machine capable of executing a first network function;
receiving, at a second data plane subsystem, a second set of network control packets of the network control packets;
forwarding, on the second data plane subsystem, a second set of network data packets, wherein the forwarding is based on the second set of network control packets; and
instantiating a second virtual machine that is capable of executing a second network function.

15. The method of claim 14, wherein the first virtual machine is capable of executing a first network function comprising a virtual network function.

16. The method of claim 14, further comprising configuring the first network function based on receiving at least one network control packet.

17. The method of claim 14, further comprising:
receiving one or more network control packets; and
instantiating a third virtual machine.

18. The method of claim 17, further comprising instantiating a third network function executing inside the third virtual machine, based on receiving the one or more network control packets.

19. The method of claim 16, wherein first data plane subsystem executes on a first device that is located at a datacenter and second data plane subsystem executes on a second device that is a customer premises.

20. The method of claim 16, wherein the first network function is one or more of a network firewall, a network level 2 forwarding, a network level 3 forwarding, virtual private network, access control list, or a private branch exchange.

* * * * *